United States Patent [19]

Banach

[11] Patent Number: 4,484,222

[45] Date of Patent: Nov. 20, 1984

[54] INTERMEDIATE FREQUENCY CIRCUIT WITH SOLID STATE TRAP

[75] Inventor: Frank G. Banach, Oak Lawn, Ill.

[73] Assignee: Zenith Electronics Corporation, Glenview, Ill.

[21] Appl. No.: 437,934

[22] Filed: Nov. 1, 1982

[51] Int. Cl.³ .............................................. H04N 5/50
[52] U.S. Cl. .................................................. 358/196
[58] Field of Search ................ 358/196, 167; 455/311, 455/307, 312

[56] References Cited

U.S. PATENT DOCUMENTS 4,107,730  8/1978  Jones .................................... 358/196

Primary Examiner—Richard Murray
Assistant Examiner—Victor R. Kostak

[57] ABSTRACT

A color television receiver includes a surface acoustic wave intermediate frequency amplifier and a gain block feeding a synchronous detector. A non-adjustable solid state (piezonator) sound carrier trap is coupled between the gain block and the synchronous detector by impedance matching capacitors.

5 Claims, 1 Drawing Figure

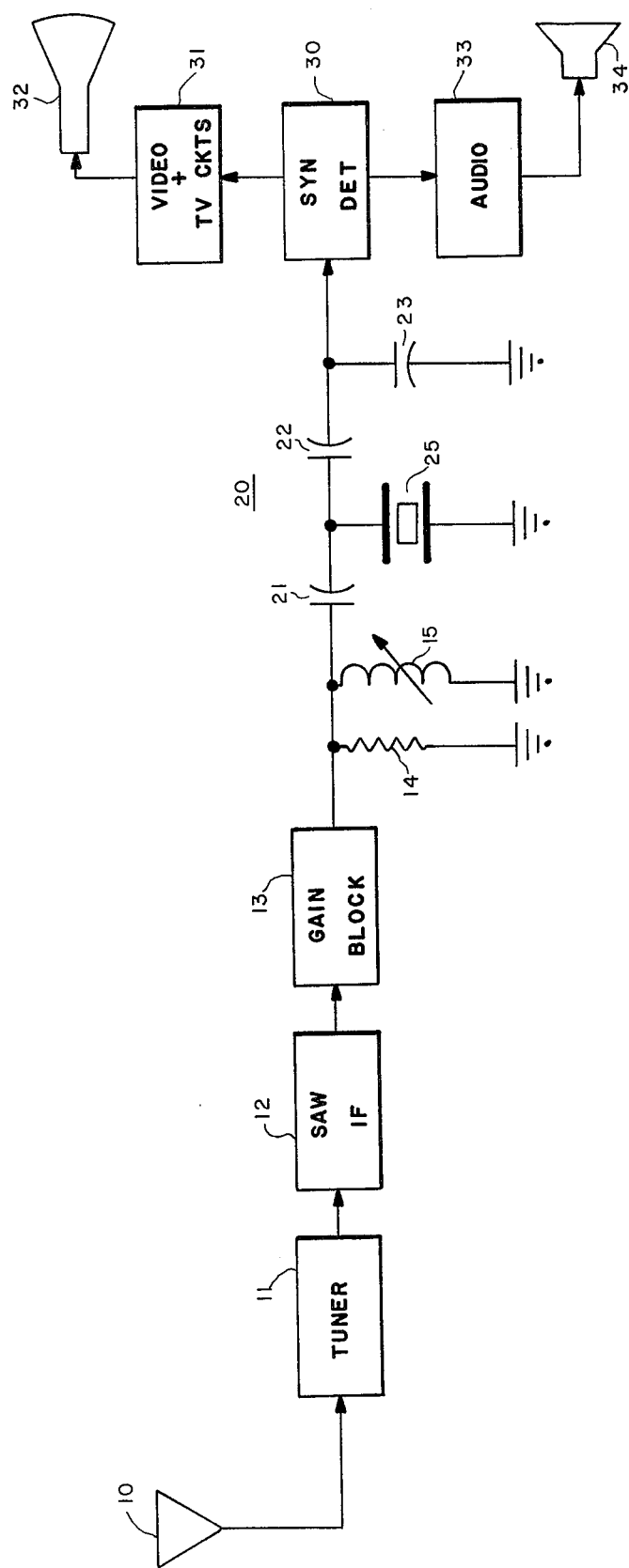

INTERMEDIATE FREQUENCY CIRCUIT WITH SOLID STATE TRAP

BACKGROUND OF THE INVENTION AND PRIOR ART

This invention relates generally to color television receivers and specifically to the intermediate frequency circuits of color television receivers.

In intercarrier sound television receiver systems, the intermediate frequency circuits process a video carrier of 45.75 MHz, a sound carrier of 41.25 MHz and a 3.58 MHz color subcarrier, which is modulated on the video carrier. As is well known, when detecting or demodulating the intermediate frequency video carrier signal, the sound carrier must be suppressed to within a very narrow range of amplitudes with respect to the video carrier to avoid cross modulation between carriers, especially between the sound carrier and the color subcarrier. Since the sound carrier must also be recovered, it cannot be suppressed to the point that its detection is impaired. Conventional intermediate frequency circuits include an adjustable sound carrier trap which, by appropriate tuning of its frequency and impedance at resonance, tailors the response characteristic of the amplifier circuit to that desired. Such techniques are well known in the art and yield excellent performance.

The increasing use of integrated circuits in color television receivers has been accompanied by marked increases in performance, reliability, and economy. The drawback of integrated circuits is that they cannot be readily changed. Hence, the very commonality of design which makes them attractive from a cost and performance standpoint makes them difficult to work with because of their inflexibility.

Another advance in television receiver performance has been brought about by use of SAW's (surface acoustic wave filters) in intermediate frequency circuits. While the vast majority of television receivers do not have SAW IF filters, a great many receivers do. The advantages of a SAW IF stage are extreme reliability, consistent performance among units and exceptional stability. The major disadvantage of a SAW filter is that it is very lossy. Some manufacturers add a preamplifier to the input of the SAW filter to compensate for the losses. The intermediate frequency signal in the output of the SAW filter is generally supplied to a gain block, followed by a sound carrier trap, prior to detection of the video carrier. The audio carrier and color subcarrier are subsequently detected in a conventional manner.

The amount of sound trapping required (depth of trap) is a function of the type of detector used. For example, in a synchronous detector or quasi-synchronous detector, the sound carrier is held about 20 db below the video carrier, whereas in an envelope detector the sound carrier is suppressed to about 40 db below the video carrier. As is well known in the art, the sound traps are adjustable and the adjustment comprises one of the critical setup adjustments that a technician must make.

Certain well known color television receivers include a preamplifier-less SAW intermediate frequency filter coupled to a synchronous detector through a gain block. A sound trap having an adjustable frequency and resonant impedance is coupled between the gain block and the detector. The sound trap is adjustable and includes a variable inductance coil and a capacitor. The inductance of the coil is a function of its form factor, that is, the physical configuration of the coil, the number of turns, and the character of the flux path (reluctance). The variable inductance is obtained by moving an iron slug in the coil's magnetic field. Unfortunately, the adjustment of the trap is critical and has secondary effects that are not always perceptible to the technician and often field-adjustment does more harm than good.

An important characteristic of the trap is its so-called Q, which is defined as the ratio of the trap impedance to the trap resistance. The higher the Q the better the trap (steeper response) and the sharper and more precise the trapping action. This is very important since a broad trap can seriously impair response to desired signals adjacent to the trap frequency.

Recently the prior art has developed a solid state trap, known in the trade as a piezonator. The advantage of a solid state trap is that it is very stable and consistent in performance and requires no adjustment. Such traps are used as sound traps in television intermediate frequency circuits in the art, but not in intermediate frequency circuits employing SAW's.

SUMMARY OF THE INVENTION

In accordance with the invention a color television receiver comprises tuner means for developing intermediate frequency signals including a video carrier, a color subcarrier and an audio carrier, intermediate frequency amplifier means including a SAW filter introducing substantial attenuation of the intermediate frequency signals, a detector for demodulating the video carrier and requiring suppression of the audio carrier to within a narrow range of amplitudes to preclude demodulation distortion between said carriers and to enable recovery of the audio carrier, a nonadjustable solid state audio carrier trap having a fixed Q and resonant impedance and means for coupling the solid state trap between the amplifier means and the detector for suppressing the audio carrier to within the range without substantially affecting the Q of the trap.

OBJECTS OF THE INVENTION

The principal object of the invention is to provide an improved color television receiver.

Another object of the invention is to provide a color television receiver incorporating an intermediate frequency amplifier including a SAW filter and a nonadjustable audio carrier trap.

Other objects of the invention will become apparent upon reading the specification in conjunction with the drawing which represents a combination block and schematic diagram of a color television receiver constructed in accordance with the invention.

DESCRIPTION OF THE PREFERRED EMBODIMENT

Referring to the drawing, an antenna 10 is coupled to a tuner 11 where a received broadcast television signal is converted into an intermediate frequency signal comprising a video frequency carrier, modulated with both video information and a modulated color signal subcarrier, and a modulated audio frequency carrier which is spaced 4.5 MHz from the video intermediate frequency carrier. The intermediate frequency signals are coupled to a SAW intermediate frequency filter 12 where they are filtered, amplified in a gain block 13 and appear across the combination of a resistor 14 and an adjustable coil 15 in the output of the gain block. The gain block and the synchronous detector may conventionally be fabricated on the same integrated circuit chip with pin terminals provided at the gain block output and synchronous detector input. Coil 15 and resistor 14 are used in intermediate frequency amplifiers including conventional audio carrier trap circuits. Thus all of the above-described elements are well known in the art.

An audio carrier trap 20 includes a solid state non adjustable piezonator 25 which is coupled to a node formed between the output of gain block 13 and the input of a synchronous detector 30 by a pair of serially connected capacitors 21 and 22. A capacitor 23 is connected across the input of the synchronous detector, the output of which feeds video and TV circuits 31 which, in turn, supplies a picture tube 32. Synchronous detector 30 also supplies an audio circuit 33 comprising a detector and amplifier (not shown) for driving a speaker 34. Everything described in the schematic, with the exception of the connection of audio carrier trap 20, is well known and needs no further elaboration.

Piezonator 25 is an "off the shelf" component having a given Q and resonant frequency selected for establishing a desired sound carrier trap characteristic. The trap characteristic, however, may be adversely effected depending on the manner in which the piezonator is connected in the circuit. For example, coupling the piezonator into the circuit after the gain block loads down the gain block because of the impedance mismatch and seriously impairs the circuit gain resulting in too much suppression of the audio carrier. Decreasing the effectiveness of the trap, that is its depth of trapping, to offset the excessive signal suppression lowers the Q of the trap and broadens its effect, resulting in attenuation of desired signals. Coupling the piezonator at the input to the synchronous detector results in shallow trapping because the impedance is too low. The impedance transforming network of the invention comprising capacitors 21, 22 and 23, overcomes these problems by producing a node intermediate the gain block and the detector for coupling the trap with proper impedance match and without deterioration of the trap Q.

The piezonator used has an inherent capacitance of about 9 picofarad. Capacitor 21 was selected to have a value of approximately 18 picofarads and capacitor 22 a value of about 27 picofarads. The trap frequency is, of course, 41.25 MHz, the frequency of the audio carrier. The counterpart prior art tunable trap, consisting of a coil and capacitor, was coupled to the output of the gain block through a 13 picofarad capacitor. The values of capacitor 21 and 22 were thus selected to keep the effective impedance between the gain block and the synchronous detector about the same as the impedance of the original circuit. The use of these two capacitors enables the non adjustable solid state trap to be coupled into the circuit at an intermediate impedance point or node and consequently permits its trapping effect to be tailored to the requirements of the synchronous detector without experiencing deterioration of the Q of the trap.

What has been described is an improved intermediate frequency circuit audio carrier trap for use in a color television receiver having an intermediate frequency amplifier including a SAW filter and a synchronous type detector. It will be appreciated that modifications in the described embodiment of the invention will suggest themselves to those skilled in the art. The invention is limited only as defined in the claims.

What is claimed is:

1. A color television receiver comprising:
   tuner means developing intermediate frequency signals including a video carrier, a color subcarrier and an audio carrier;
   intermediate frequency amplifier means including a SAW filter introducing substantial attenuation of said intermediate frequency signals;
   a detector for demodulating said video carrier, said detector requiring suppression of said audio carrier to within a narrow range of amplitudes to preclude demodulation distortion between said carriers and to enable recovery of said audio carrier;
   a non adjustable solid state audio carrier trap having a fixed Q and resonant impedance; and
   means for coupling said solid state trap between said amplifier means and said detector for suppressing said audio carrier to within said range without substantially affecting the Q of said trap.

2. The television receiver of claim 1 wherein said detector requires a low impedance input, and further including:
   a gain block having a high impedance output coupled to the output of said SAW filter for amplifying said intermediate frequency signals.

3. The television receiver of claim 2, wherein said coupling means comprise impedance transformation means for matching the impedance of said solid state trap to the output impedance of said gain block and to the input impedance of said detector.

4. The television receiver of claim 3 wherein said coupling means comprise a pair of series-connected capacitors establishing a node intermediate said gain block and said detector, said trap being connected to said node.

5. The television receiver of claim 4 wherein said trap has an effective capacitance and wherein the capacitance values of said series-connected capacitors are selected to establish a voltage transformation with the effective capacitance of said trap to produce suppression to within said narrow range of amplitudes.

* * * * *